July 21, 1931.  J. ZUBATY  1,815,641
THERMOSTATIC CONTROL
Filed Jan. 29, 1926
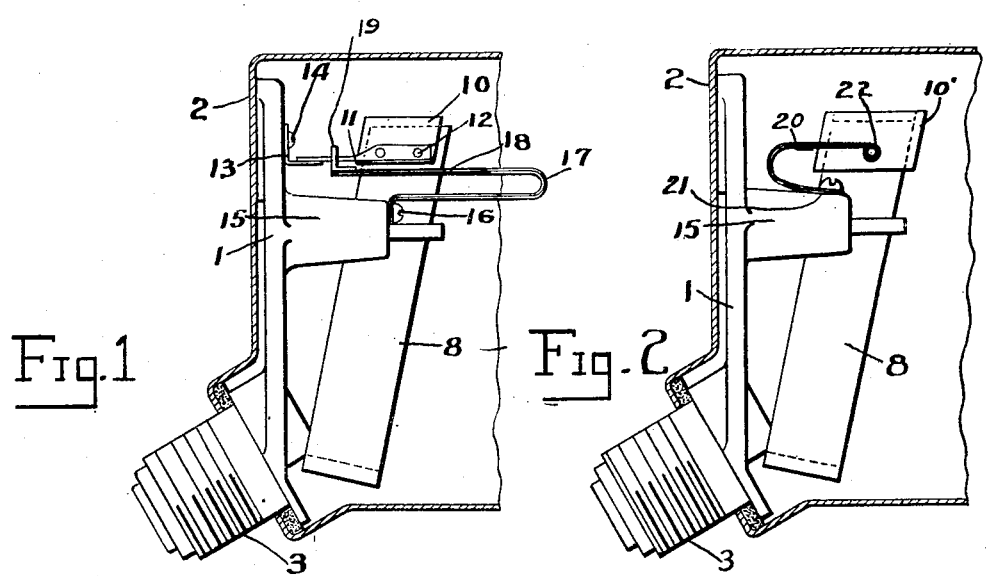
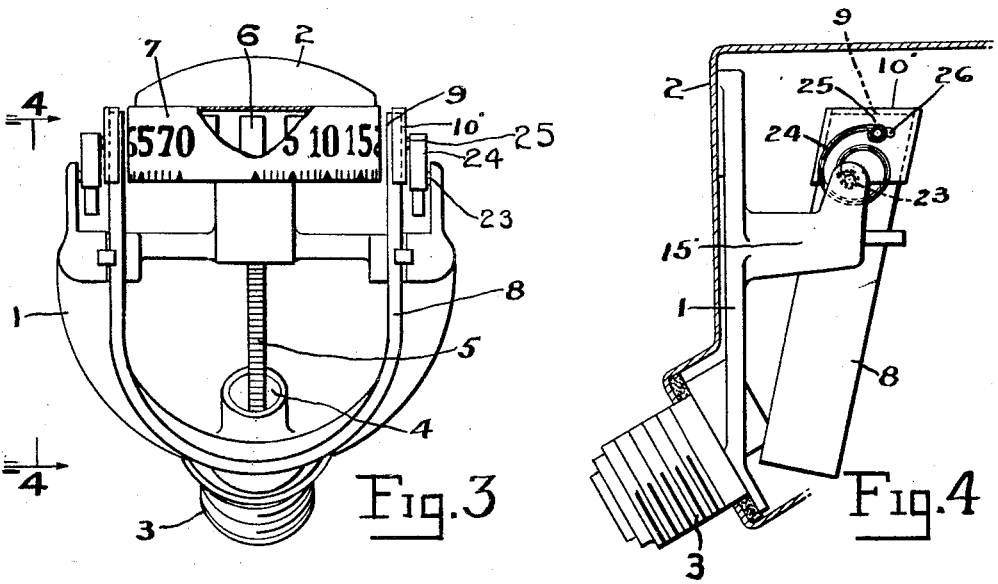
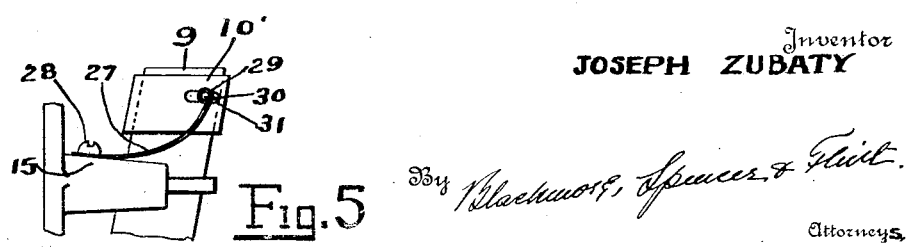
JOSEPH ZUBATY, Inventor Patented July 21, 1931

1,815,641

UNITED STATES PATENT OFFICE

JOSEPH ZUBATY, OF FLINT, MICHIGAN, ASSIGNOR TO A C SPARK PLUG COMPANY, OF FLINT, MICHIGAN, A COMPANY OF MICHIGAN

THERMOSTATIC CONTROL

Application filed January 29, 1926. Serial No. 84,791.

This invention has to do with a speedometer or other measuring instrument and is particularly concerned with a speedometer as used on motor vehicles.

It is known that at high temperatures the readings of the usual magnetic speedometers are too low, and that the readings are too high when the air temperature is lower. With a variation of 100°, which variation a motor vehicle speedometer must contend with, the variation in readings becomes considerable. This variation is due to the variable conductivity of the speed cup or indicator, the rotation of which between the magnet poles measures the speed of the vehicle.

An object of this invention is to automatically modify the magnetic field to compensate for the temperature variation.

A further object is to produce that modification of the field by automatically moving a soft iron shoe, along one or both the poles of the magnet.

A further object is to utilize a bimetallic thermostatic element to so move the iron shoe. Such movements of the shoe along the arms of the magnet directly modify the intensity of the field across the armature and speed cup. Moreover, this movement of the shoe may be made to vary the dimensions of the gap between the magnet pole and the steel case. This latter feature constitutes a variable magnetic shunt.

For further explanation of several embodiments in which the invention is carried out reference is made to the following description and the accompanying drawings.

In the drawings, Figure 1 is a side elevation of a preferred form. Figure 2 is a similar view of a second form. Figure 3 is a plan view looking at the inner face of the supporting frame of a third form of the invention. Figure 4 is a side view of the form shown in Figure 3, parts being omitted. Figure 5 shows a slightly different modification, also in side elevation.

Referring to the drawings, numeral 1 is used to designate the frame member used to support the speedometer parts. This frame member 1 is inclosed in a casing 2. The frame has a rearwardly and downwardly directed extensions at 3 through an opening 4 in which a driving member passes to operate the flexible coupling 5. This coupling 5 drives a rotating armature 6 within the speed cup 7, of aluminum or other conducting material. Embracing the speed cup and rotor are the sides of a U shaped magnet 8, its poles 9 lying at the opposite extremities of the diameter of the speed cup. The mounting of the magnet and the provision of a suitable spindle and bearings for the rotor and speed cup are of no concern to this invention.

As explained above, it is proposed to make correction for inaccurate readings caused by the changing conductivity of the speed cup at different temperatures by making use of a soft iron shoe, movable on one or one on each of the arms of the magnet.

Such a shoe is shown in Figure 1 at 10 lying along one face of the magnet arm. This shoe extends somewhat above the magnet pole. It is secured to a support 11 by fastening means 12. The latter is secured to a right angular spring member 13, one side of its angle being held by a screw 14 to the base of the frame. Secured to the outer face of a lug 15 on the frame by fastening means 16 is the turned over end of an elongated U shaped bimetallic thermostatic element 17. The other extremity of the latter is extended inwardly as at 18 toward the frame to a point beyond the end 16 where it is turned up and braces the member 11 as shown at 19. Under the influence of a thermostat the embracing end 19 moves the support up or down, the spring bending at its elbow the movements amounting to a pivot for the shoe 10 at the elbow of the spring. In as much as the shoe is further removed from this pivot than the point at which the actuating thermostat applies its force, a relatively large movement is given to the shoe. The movement of the shoe beyond the pole of the magnet lessens the magnetic flux across the armature and speed cup because of its removal from the extremities of the diameter of the cup. It also lessens the gap between the shoe and the case and thereby increases the shunt effect of the case. This serves as an additional means for reducing the magnetic flux across the rotor and speed cup. It will be seen therefore that when the air temperature is low and the readings tend to be too high, they are automatically reduced by the action of the thermostat in moving the shoe away from the magnet poles and towards the steel case. Again, when the temperature is high, the conductivity of the speed cup is low and the reading is low. The thermostat then brings the shoe away from the case, reduces the shunt and strengthens the magnetic field across the rotor. The temperature variations are thus automatically compensated for.

A simpler form is shown by Figure 2. Here the parts are arranged substantially as in Figure 1. The shoe 10' extends beyond the edges of the magnet and the thermostat is a U shaped member 20 having one end fastened to the frame lug 15 on its upper face as at 21. Its other end is looped over fastening means 22 on the shoe. The movements under the influence of temperature are precisely the same as in the form heretofore described. Figures 3 and 4 illustrate a third form of the invention. In this modification a frame lug 15' carries one end 23 of a spiral thermostatic element 24. The remote end 25 engages in a slot 26 of the shoe which slides along the outer face of the magnet end with its ends engaging the edges of the magnet.

In Figure 5 is perhaps the simplest form. Here the thermostat is merely a curved member 27 fastened at one end to lug 15 near the frame as at 28. The opposite end of the thermostat has an eye 29 on a pin 30 which moves in a slot 31 in the sliding shoe similar to the shoe shown in Figure 4.

It will be understood that in the case of each of these forms a shoe may be used upon one of the magnet poles, or a shoe may be located upon each of the magnet poles, the effect of the use of shoes upon both being obviously to intensify the effect of the compensating influence.

I claim:

1. In a speed measuring instrument, a casing of magnetic material, a frame, a magnet having poles straddling a rotary indicating member, means to control the intensity of the magnetic field comprising a soft iron mass slidable along the outer face of a magnetic pole toward and away from said casing, actuating means including a movable member connecting the soft iron mass to the frame and a thermostat actuating the movable member at a point in its length such that the movable connecting member produces an amplified movement in the soft iron mass.

2. In a measuring instrument giving readings depending upon the intensity of the magnetic field comprising a casing of magnetic material, a magnet mounted therein, a magnetic mass slidable along the pole of the magnet to positions adjacent and beyond the pole and toward the wall of the casing, a member secured to the frame and pivotally holding the magnetic mass, a U shaped bimetallic thermostat secured at one end to the frame and engaging the holding member at a point between the magnetic mass and its frame attachment.

3. The combination set forth in claim 2 wherein the holding means including a spring position adjacent the frame, the yielding of the spring at its point of attachment with the frame serving as a pivot.

4. In a measuring instrument dependent upon a magnetic field, means to vary the intensity of the field comprising a casing of magnetic material, a frame, a magnet, a magnetic mass slidable along the pole of said magnet to and from said casing, means connecting the mass to the frame, functioning as a pivot for the mass, a thermostat connected to the frame and effective through the connecting means at a point between the pivot and the magnetic mass to amplify the movements of the mass.

In testimony whereof I affix my signature.

JOSEPH ZUBATY.